United States Patent [19]
Grenier

[11] Patent Number: 4,793,279
[45] Date of Patent: Dec. 27, 1988

[54] ICE-CREAM DISPENSER

[76] Inventor: Laval Grenier, 1340 Vachon Blvd., South, Sainte-Marie de Beauce, Canada, G6E 2S5

[21] Appl. No.: 51,826

[22] Filed: May 20, 1987

[51] Int. Cl.$^4$ ................................. B05C 5/02
[52] U.S. Cl. ........................ 118/16; 118/25; 141/104
[58] Field of Search ............. 118/25, 16; 141/283, 141/173, 104

[56]  References Cited
U.S. PATENT DOCUMENTS

| | | | |
|---|---|---|---|
| 2,910,042 | 10/1959 | Gallmeyer et al. | 118/306 X |
| 4,645,093 | 2/1987 | Jones | 141/104 X |

FOREIGN PATENT DOCUMENTS

| | | |
|---|---|---|
| 411011 | 6/1940 | Canada . |
| 535512 | 8/1957 | Canada . |
| 771409 | 11/1967 | Canada . |
| 883029 | 12/1971 | Canada . |
| 981108 | 6/1976 | Canada . |

Primary Examiner—John McIntosh

[57] ABSTRACT

A conventional apparatus for dispensing ice-cream of the type having a lever-operated vertically-disposed and downwardly-directed dispensing nozzle, is combined with one or more syrup applicators, each having lever-operated dispensing nozzles disposed below and substantially normal to the ice-cream nozzle. After or during dispensing of ice-cream into a cone, one or more selected syrups are applied to the ice-cream discharged in the cone, while the latter is rotated by hand.

1 Claim, 4 Drawing Sheets

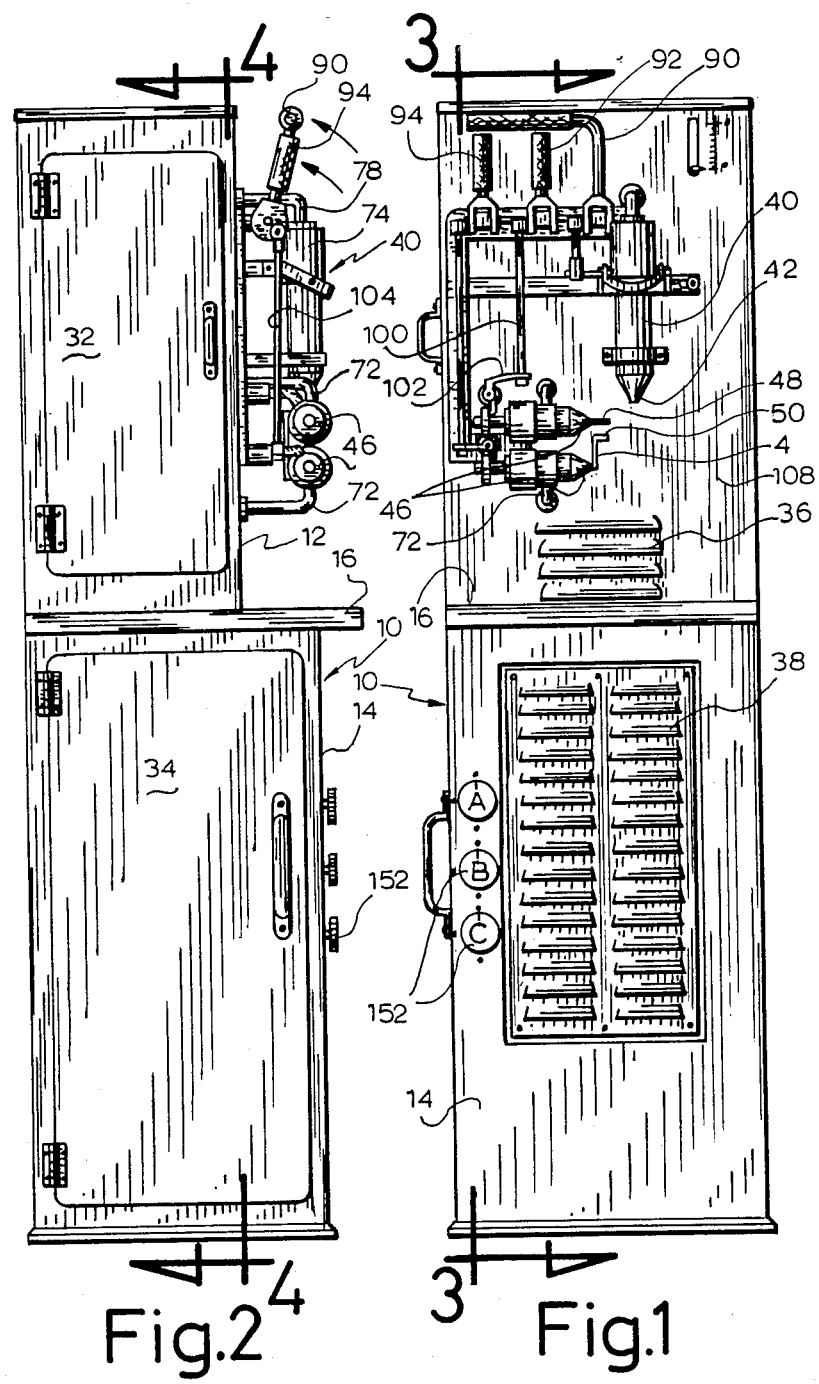

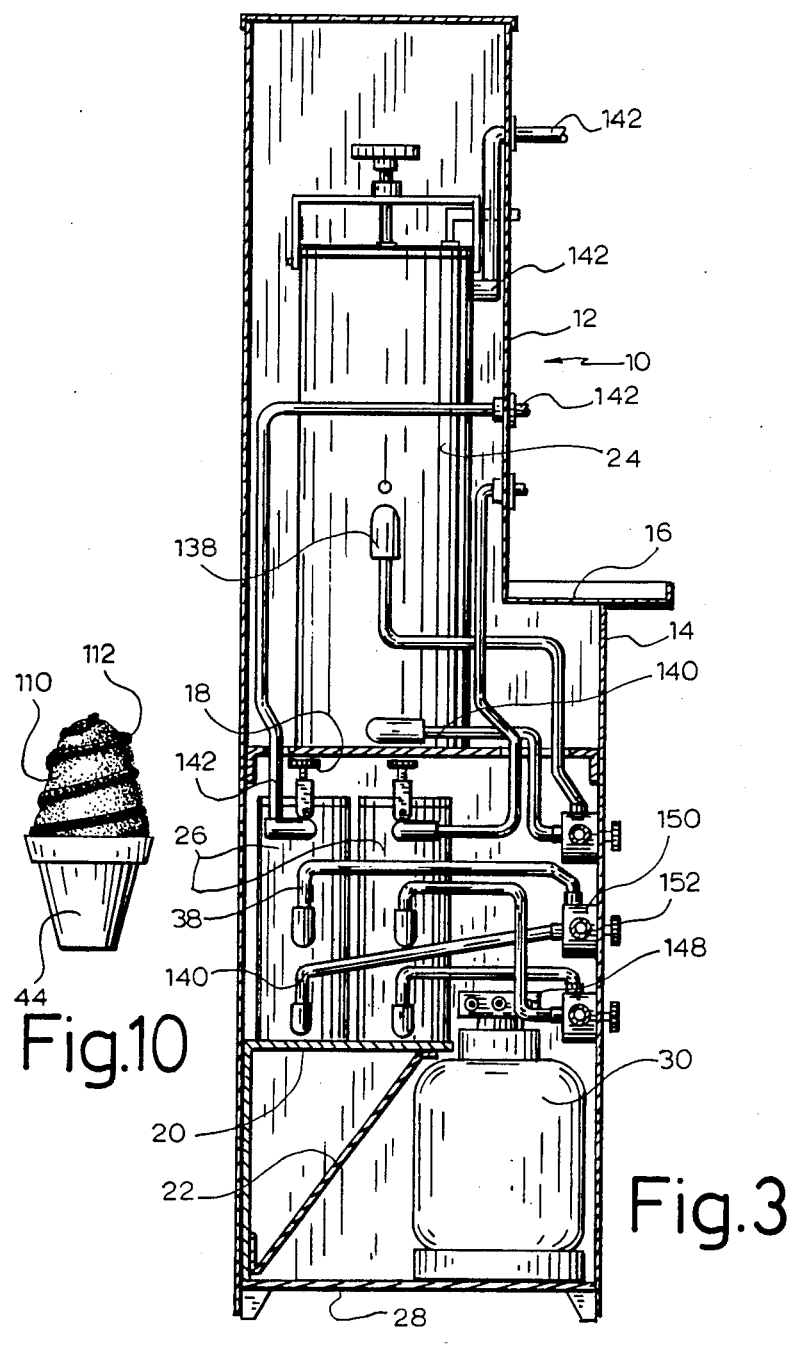

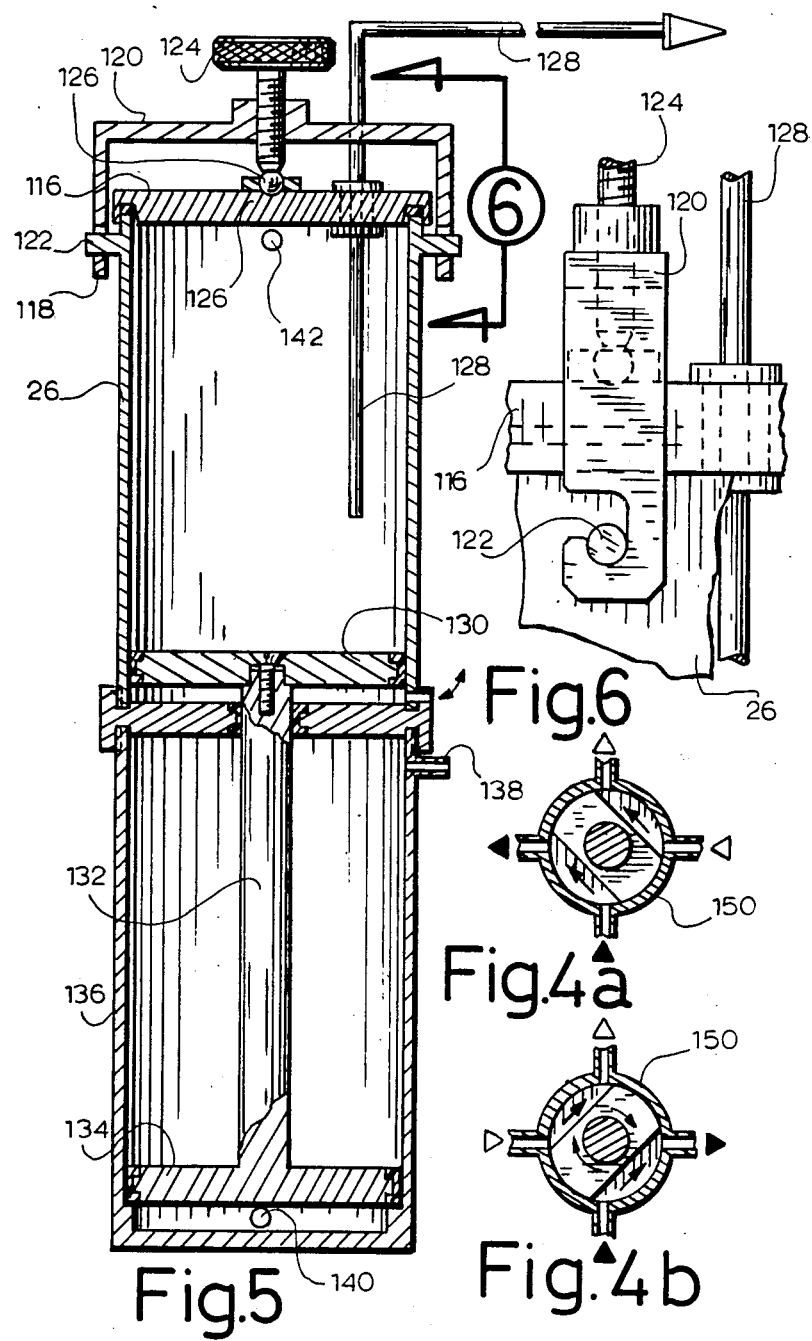

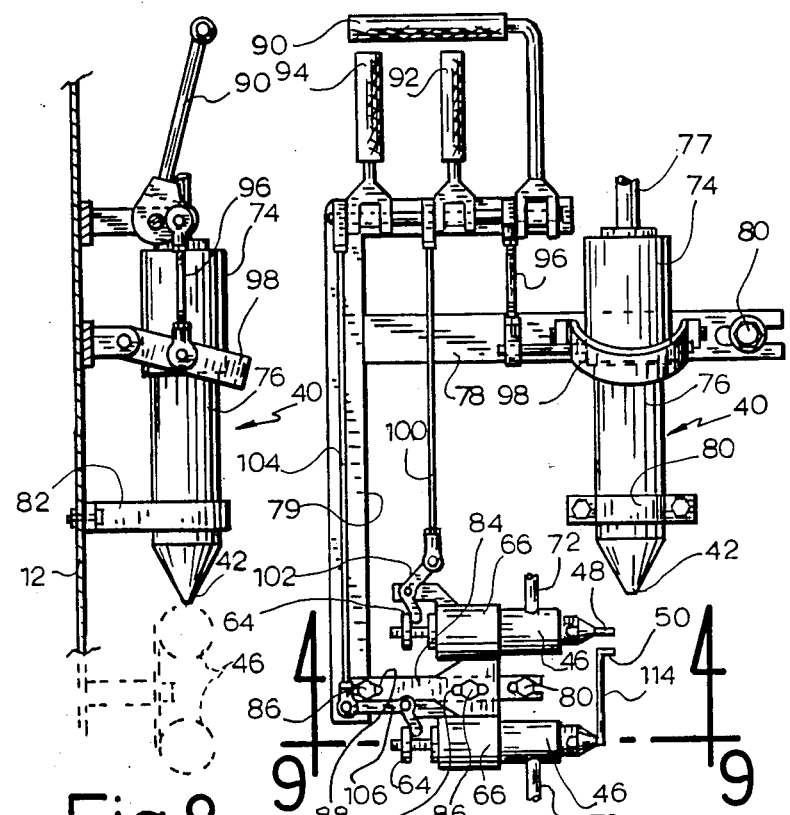
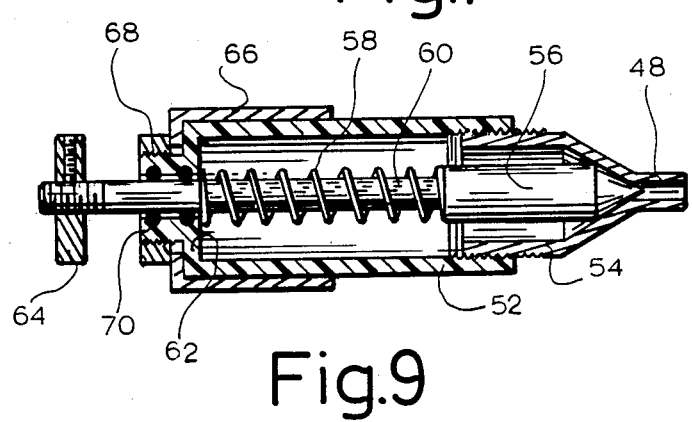

ICE-CREAM DISPENSER

FIELD OF THE INVENTION

This invention relates to ice-cream dispenser machines.

BACKGROUND OF THE INVENTION

Machines for dispensing ice-cream are known. Machines for dispensing ice-cream have several juxtaposed strips of different colors and/or flavors in a single stream, are also known. The disadvantage of the latter type of machines is that the relative proportions of flavors are fixed and cannot be changed by user filling the cones.

OBJECTS OF THE INVENTION

The main object of the invention is to apply in a selected manner a sweetener additive to the surface of ice-cream dispensed by a conventional ice-cream dispensing machine.

Another object of the invention is to permit variability in the amount and decorative effect of sweetener additives added to ice-cream dispensed in a cone.

Another object of the invention is to provide a machine of the character described, which is of simple construction.

SUMMARY OF THE INVENTION

The applicator of the invention is for use with an ice-cream dispenser including a casing, a supply of pressurized ice-cream in said casing, a manually-operated main nozzle connected to said supply and mounted to a casing wall, and downwardly opening to discharge ice-cream into an underlying hand-held cone. The applicator is meant to apply a sweet additive, such as maple syrup, chocolate syrup and the like, to the surface of the ice-cream being discharged into the cone.

The applicator comprises a supply of pressurized sweet additive and a manually-operated secondary nozzle connected to said last-named supply and mounted to said casing wall below said main nozzle and directed towards the path of discharge of ice-cream from said main nozzle. Preferably, both nozzles are lever operated and their levers are mounted to the casing wall in adjacent relation to be operated by a single hand. It is possible to mount several secondary nozzles to the casing wall with all the levers of the various nozzles conveniently grouped together for easy operation. Preferably, when two secondary nozzles are mounted one below the other, one nozzle has a Z-shape tubular discharge arranged with its outer end close to the discharge end of the other nozzle, so that two flavors may be discharged very close one to the other.

BRIEF DESCRIPTION OF THE DRAWINGS

FIGS. 1 and 2 are front and side elevations respectively of an ice-cream dispensing apparatus combined with syrup dispensers in accordance with the invention;

FIG. 3 is a sectional elevation of the apparatus taken along line 3—3 of FIG. 1;

FIG. 4 is a schematic diagram of the ice-cream and syrup-dispensing network;

FIGS. 4A and 4B are enlarged cross-sectional views of the two-way valve of the network of FIG. 4, in two different operative positions, respectively;

FIG. 5 is an enlarged longitudinal section of one of tee containers for the syrup or sweet additives;

FIG. 6 is a partial elevation of the container of FIG. 5 and looking along line 6 of the latter;

FIG. 7 is an enlarged front elevation of the ice cream dispenser and associated sweet additive dispensers and of their operative levers;

FIG. 8 is a side elevation of part of the assembly of FIG. 7, as applied to the front wall of FIG. 9 is a longitudinal sectional view of sweet additive dispenser; and FIG. 10 is an elevation of an ice-cream cone filled with ice-cream, the latter covered with syrup strips dispensed from the apparatus of the present invention.

DETAILED DESCRIPTION OF THE PREFERRED EMBODIMENT OF THE INVENTION

In the apparatus shown, the main ice-cream supply and two sweet additive supplies are mounted in a common casing. Obviously, the apparatus of the invention can also be applied to existing dispensers, in which case the sweet additive supplies would be arranged externally of the conventional ice-cream dispenser casing.

In the example illustrated, there is provided an upright casing 10, having a front wall consisting of an upper front wall section 12 and a lower front wall section 14, separated by a shelf 16. Inside the casing 10, there are provided a horizontal partition 18 and a lower shelf 20 reinforced by struts 22. A main cylinder 24 is supported upright on partition 18 and secondary cylinders 26 are supported upright on shelf 20. Main cylinder 24 is designed to contain ice-cream, while secondary cylinders 26 are designed to contain and form supply for sweet additives such as maple syrup, chocolate syrup and the like flavors.

The bottom 28 of the casing 10 supports a tank of gas under pressure, indicated at 30.

As shown in FIG. 2, casing 10 is provided with lateral access openings, normally closed by upper and lower doors 32, 34, respectively. Front wall sections 12 and 14 are provided with ventilation openings 36, 38, as shown in FIG. 1. An ice-cream dispenser nozzle 40 is mounted to the upper front wall section 12 in upright position, with its nozzle opening 42 directed downwardly, so as to discharge ice-cream towards shelf 16 into a cone, as illustrated in FIG. 10 and shown at 44, which is preferably hand held. One or more secondary nozzles 46 for dispensing sweet additive, such as maple syrup, chocolate syrup and the like, from the secondary cylinders 26, are mounted to the upper front wall section 12 below the ice-cream dispenser nozzle 40 and with their nozzle orifice 48, 50 directed generally horizontally and to direct a stream of sweet additive in a path to intersect the path of the ice-cream dispensed from nozzle 40.

Lower orifice nozzle 50 is at the end of a Z-shape tube arranged to be adjacent to the nozzle orifice 48 of the upper one of the secondary nozzles 46. FIG. 9 shows the internal construction of each nozzle 40, 46. It includes cylindrical body 52, to the front end of which is screwed a head 54 which defines the nozzle orifice 42 or 48, and which defines also an internal frusto-conical valve seat for a needle valve member 56, biased in valve-closing position by a compression coil spring 58 surrounding the operating stem 60 of the needle valve member 56 and abutting against 52 at the other end.

A disc 64 is adjustably threaded on the projecting end of the stem 60 and serves to transmit a pulling force on the stem 60 to open the valve of the nozzle. A mounting bracket 66 is fixed to the body 52 by means of a nut 68 screwed on the cylindrical projection 70 of the end wall 62 of the body 52. Body 52 of each of the secondary nozzles 46 receives a sweet additive, such as maple syrup, through a lateral tube 72 (see FIG. 7), just behind the valve member 56. Ice-cream dispenser nozzle 40 is of conventional construction, somewhat different from the secondary nozzle, in that it has an internal needle valve which is operated to open position by a pulling action exerted on the sleeve 74, which surrounds the cylindrical body 76 of the nozzle 40. An ice-cream feeding tube 77 is connected to the inside of the body 76. A bracket 78 is secured to the upper front wall section 12 of casing 10, as by bolts, including bolts 80. As shown in FIG. 8, the ice-cream nozzle 40 is mounted spaced from the front wall by the bracket 78 and also by a collar 82. The secondary nozzles 46 are also mounted spaced from front wall section 12, so that their orifices 48, 50 are in the vertical plane of the nozzle orifice 42. The mounting brackets 66 of the two secondary nozzles 46 are formed as a one-piece assembly, including collars surrounding the bodies 52 of the two nozzles and a mounting plate 84, which is fixed to the lower·horizontal arm of the bracket 78 by means of bolts 86 and elongated slots 88, so as to be capable to horizontally adjust the position of the two secondary nozzles 46.

On the upper horizontal arm of the bracket 78, are pivotally mounted three levers 90, 92, and 94 arranged in close relationship for either simultaneously actuating all of the nozzles 40 and 46 or selective ones of the same. L-shape manually-actuated lever 90 is connected by linkage 96 and pivoted half-collar 98 to the sleeve 74, so that forward pivoting of lever 90 will lift sleeve 74 to open the inner needle valve of the ice-cream dispenser 40, so as to discharge ice-cream from its nozzle orifice 42. Similarly, forward movement of lever 92 causes downward movement of link 100 and clockwise (see FIG. 7) pivotal movement of crank arm 102, so as to pull the disc 64 and stem 60 to open the valve of the upper secondary nozzle 46. Forward pivotal movement of lever 94 causes upward movement of link 104 and, therefore, retracting movement of the needle valve of the lower nozzle 46 through the crank arm 106.

Obviously, additional sweet additive applicator nozzles 46 could be arranged opposite secondary nozzles 46, so as to have, for instance, four secondary nozzles, each for applying a different one or different types of sweet additives or syrups. As shown in FIG. 10, as the cone 44 is being gradually filled with ice-cream 110, one or more strips of maple syrup or the like, indicated at 112, may be applied to the external surface of the ice-cream, as tee cone 44 is being rotated by hand. This enables decorative effects to be obtained and impart selective flavor to the ice-cream. In order to apply the sweet additive from the two secondary nozzles 46 at a restricted zone, the lower one of the secondary nozzle 46 is provided with a Z-shape discharge tube 114, so that both nozzle orifices 48 and 50 be close together.

FIG. 4 shows the piping connection and the valves interconnecting the cylinders 24, 26, and FIGS. 5 and 6 show a preferred construction of the cylinders 24 and 26. Referring to the latter figure, the secondary cylinder 26 for containing a sweet additive can be filled through the open top thereof by removing a pressure-resisting cover 116, which is held in place by the hook-shape ends 118 of a yoke 120, the hooks 118 releasably engaging lateral studs 122 of the cylinder 6. The yoke 120 carries a threaded handoperated bolt 124, which exerts a pressure on the center of the cover 116 through the ball 126. A rod 128, freely slidable through the cover, indicates the level of ice-cream or sweet additive still remaining in the cylinder 24 or 26, respectively. The ice-cream sweet additive is pushed by a feeder piston 13. This piston is actuated by a piston rod 132 provided at its lower end with an actuator piston 134 movable within an actuator cylinder 136 co-axial with container cylinder 26. Piston 134 and cylinder 136 constitute a double-acting air actuated ram selectively fed with pressurized air on each side of actuator piston 134 through upper and lower inlets 138 and 140. When pressurized air is fed by lower inlet 140, actuator piston 134 moves up, so as to discharge sweet additive or ice-cream through an upper outlet 142 of the container cylinder 26 under the action of the upwardlymoving feeder piston 130. When the container cylinder 26 is nearly empty, as indicated by the lever indicator rod 128, the piston 130 is retracted by retracting movement of the actuator piston 134, inlet 138 then allowing pressurized air in inlet 140 being connected to the atmosphere. The cover 116 can be removed and the container cylinder 26 again filled with the sweet additive.

FIG. 4 shows that the actuator cylinders 136 of the various cylinder containers 24, 26 are actuated from the common gas tank 30 via a valve 142, common line 144, with a manometer 146, manifold 148, connected to the inlet of three two-way valves 150, each one rotatable through a 90° angle, as shown in FIG. 4A or FIG. 4B to selectively admit air through inlet 138 or inlet 140 for each of the individual actuator cylinders, so as to cause ejection action of the piston 130, or its retraction, as above explained.

The three two-way valves 150 can be selectively actuated by means of knobs 152 mounted at the front wall section 14 of the casing 10, as shown in FIGS. 1, 2 an 3.

What I claim is:

1. In combination, an ice cream dispenser frame, an ice cream supply means, a sweet additive supply means, a first nozzle operatively connected to said ice cream supply means and anchored in vertical position to said frame and defining a bottom mouth, a second nozzle operatively connected to said sweet additive supply means and anchored in horizontal position to said frame and defining a mouth proximate said first nozzle mouth; each nozzle defining a sealable casing, a valve member movable into said sealable casing, biasing means to bias the valve member to close the corresponding nozzle mouth, and manual lever means to pull the valve member out of the nozzle mouth against the bias of said biasing means; wherein said nozzle mouth constitutes a frusto-conical end section of said nozzle casing; each said valve member consisting of an elongated rigid rod member having a needle valve member at one end, said needle valve member defining a conical free end frictionally sealingly closing said nozzle mouth under the bias of said biasing means; whereby actuation of said manual lever means progressively continuously disengages said needle valve member from said mouth.

* * * * *